United States Patent
Boos

(10) Patent No.: US 10,581,236 B2
(45) Date of Patent: Mar. 3, 2020

(54) METHOD FOR GENERATING A TRIP CURRENT FOR TRIGGERING AN ELECTRICAL PROTECTION ELEMENT

(71) Applicant: SOCOMEC, Benfeld (FR)

(72) Inventor: Pascal Boos, Geispolsheim (FR)

(73) Assignee: SOCOMEC, Benfeld (FR)

( * ) Notice: Subject to any disclaimer, the term of this patent is extended or adjusted under 35 U.S.C. 154(b) by 0 days.

(21) Appl. No.: 16/312,077

(22) PCT Filed: Jun. 26, 2017

(86) PCT No.: PCT/FR2017/051696
§ 371 (c)(1),
(2) Date: Dec. 20, 2018

(87) PCT Pub. No.: WO2018/002501
PCT Pub. Date: Jan. 4, 2018

(65) Prior Publication Data
US 2019/0165560 A1    May 30, 2019

(30) Foreign Application Priority Data
Jun. 28, 2016 (FR) .................... 16 56032

(51) Int. Cl.
*H02H 3/08* (2006.01)
*H02H 3/05* (2006.01)
(Continued)

(52) U.S. Cl.
CPC .............. *H02H 3/08* (2013.01); *H02H 3/02* (2013.01); *H02H 3/021* (2013.01); *H02H 3/05* (2013.01); *H02H 7/1227* (2013.01); *H02J 9/06* (2013.01)

(58) Field of Classification Search
CPC ......... H02H 3/023; H02H 7/122–1227; H02H 3/08; H02J 9/00–08
See application file for complete search history.

(56) References Cited

U.S. PATENT DOCUMENTS 3,454,860 A  *  7/1969  Burkett .................. B27B 17/00
                                                    322/89
5,698,887 A  *  12/1997 Kumano ................ H02H 5/044
                                                    257/467
(Continued)

FOREIGN PATENT DOCUMENTS

EP     1580873 A1    9/2005

OTHER PUBLICATIONS

International Search Report and Written Opinion from PCT Application No. PCT/FR2017/051696, dated Oct. 11, 2017.

*Primary Examiner* — Thienvu V Tran
*Assistant Examiner* — Christopher J Clark
(74) *Attorney, Agent, or Firm* — Workman Nydegger

(57) ABSTRACT

A method of generating a trip current by a power supply device has electrical components and for the purpose of tripping a protection element connected between a load and the power supply device. In response to detecting an electrical fault situation in the power supply device, in order to eliminate the short-circuit fault with shortened tripping time, an AC trip current is generated having: for a first period of the signal, a current amplitude equal to the maximum current amplitude that can be withstood by the electrical components of the power supply device; and for the following periods, a current amplitude that decreases as a function of the thermal inertia of the electrical components.

10 Claims, 3 Drawing Sheets

(51) Int. Cl.
*H02H 7/122* (2006.01)
*H02H 3/02* (2006.01)
*H02J 9/06* (2006.01)

(56) References Cited

U.S. PATENT DOCUMENTS

| | | | |
|---|---|---|---|
| 6,633,474 B1* | 10/2003 | Boudaud | H02H 7/30 361/95 |
| 2001/0029434 A1* | 10/2001 | Hofmann | H02P 9/30 702/64 |
| 2005/0207194 A1* | 9/2005 | Baudesson | H02M 7/487 363/98 |
| 2006/0158798 A1* | 7/2006 | Jackson | H02H 3/334 361/42 |
| 2015/0364286 A1* | 12/2015 | Kang | H01H 83/20 337/227 |

\* cited by examiner

METHOD FOR GENERATING A TRIP CURRENT FOR TRIGGERING AN ELECTRICAL PROTECTION ELEMENT

BACKGROUND OF THE INVENTION

The invention relates to an uninterruptible power supply, and more particularly to a method of using the uninterruptible power supply device to generate a trip current for the purpose of tripping a protection device located in the installation powered by the uninterruptible power supply device.

An uninterruptible power source or uninterruptible power supply (UPS) is an electronic power device that serves to deliver stable alternating current (AC) without any interruptions or micro-interruptions, regardless of what happens on the electricity network.

A UPS is generally used to supply electrical power to buildings such as data centers, e.g. such as centers hosting data or industrial websites.

The term "inverter" is frequently misused to designate the entire device. This applies for example with the inverters that are interposed between the power supply network and servers in a computer center.

A UPS is constituted by a converter, or "rectifier", for converting an AC voltage into a direct current (DC) voltage for an energy storage device such as a storage battery or supercapacitors, and by a converter, or "inverter", that produces an AC voltage from a DC voltage, and that operates at a fixed frequency.

The various electrical power converters of a UPS are controlled by electronic power devices and by embedded programs.

A short circuit in a load connected to an outlet terminal of a UPS can give rise to faulty delivery of electricity by a UPS. In order to isolate various situations that give rise to faulty distribution of electricity by a UPS as they appear, various protection elements, such as fuses or circuit breakers, are connected between the UPS and the load.

In order to trip such protection elements as quickly as possible once a fault has appeared, the UPS needs to provide as much energy as possible as soon as the fault appears. In other words, the energy that the UPS needs to deliver, which energy corresponds to the product of the square of the current multiplied by time $i^2t$, needs to be maximized until the protection is tripped. This energy peak as generated by a current peak is for the purpose of tripping the protection circuit connected between the load and the UPS, i.e. to isolate the load fault. More precisely, the current peak is intended to melt, and thus to open, the fuse, or else to trip the circuit breaker, or more generally the electrical disconnection device, located upstream from the fault.

The main difficulty relating to generating a trip current is to be able to deliver such a current, while remaining within thermal conditions that can be withstood by the inverter, i.e. thermal conditions that avoid any degradation of the other elements of the inverter, such as its semiconductors.

Specifically, since a trip current of very high amplitude passes through the entire electric circuit, the various electrical components in the circuit heat up as a result of this current.

Furthermore, not all of the electrical components can withstand the same maximum current passing through them.

Each component thus presents limit characteristics, and in particular a limit current or amplitude beyond which the component is damaged regardless of the length of time during which the current is applied, and a limit temperature above which the electrical component runs the risk of being damaged.

A conventional solution consists in delivering squarewave AC at the same frequency as the voltage signal that is delivered under normal circumstances, i.e. when no fault is present. This AC, an example of which is shown in FIG. 1, presents an amplitude that is constant throughout the duration of the fault, with this AC being applied for a duration that does not exceed the limit thermal conditions of the UPS, i.e. being applied for a duration that avoids component temperatures exceeding their acceptable limit values.

A second known solution consists in supplying squarewave AC presenting a first amplitude during a first time duration and a second amplitude different from the first amplitude during a second time duration following the first time duration, as shown in FIG. 2, which shows an example of the AC signal in this second known solution.

In the first instants of generating the squarewave AC, i.e. during the first time duration, the squarewave AC presents a first amplitude that is higher than the constant amplitude of the signal in the conventional solution shown in FIG. 1. Given that the energy delivered by a current corresponds to the product of the square of the current multiplied by the duration for which the current is applied, i.e. $i^2t$, the energy delivered during the first instants, i.e. during the first time duration, is greater than in the above-described conventional solution of FIG. 1. Most fault situations are dealt with during these first moments, i.e. in most circumstances the protection devices such as circuit breakers or fuses trip during this first step.

In instants following the first instants, i.e. during the second time duration immediately following the first time duration, the delivered current is reduced to a non-zero value that serves to comply with the limit thermal conditions for the components of the UPS, i.e. the current presents a second amplitude that is lower than the first amplitude and that is lower than the constant amplitude of the conventional solution shown in FIG. 1. This second time duration is generally of use under circumstances in which delayed-tripping circuit breakers are used, or in circumstances in which fuses are at the melting limit.

Nevertheless, the two known solutions described above do not make it possible to use all of the available capacity of the UPS for protecting electrical faults.

OBJECT AND SUMMARY OF THE INVENTION

The invention seeks to provide a method that makes it possible to maximize the magnitude of a trip current delivered by a power supply device until a protection element trips, while controlling the amplitude of the trip current over time as a function of the thermal inertia of the electrical components of the power supply device.

The invention firstly provides a method of generating a trip current by a power supply device having electrical components and for the purpose of tripping a protection element connected between a load and said power supply device.

According to a general characteristic of the invention, in response to detecting an electrical fault situation in the power supply device, an AC trip current is generated having: for a first period of said signal, a current amplitude equal to the maximum current amplitude that can be withstood by the electrical components of said power supply device; and for the following periods, a current amplitude that decreases as a function of the thermal inertia of said electrical components.

The method thus makes it possible firstly to deliver a trip current of amplitude that is as great as possible at the instant when the fault is detected, thereby maximizing the chance of tripping the protection element in the first instants following detection of the electrical fault, and secondly to maximize continuously the amount of energy that is delivered over time by the trip current until the fault is isolated from the circuit, i.e. until the protection element trips.

The way the amplitude of the trip AC signal decreases as a function of the thermal inertia of the components of the power supply device makes it possible to match the waveform of the trip signal as well as possible to the limit thermal conditions of the components of the power supply device, and thus to make full use of the performance potential of the power supply device. When the protection element is a fuse, this makes it possible in particular to deliver the maximum possible amount of heat energy from the first instants in order to cause the fuse to melt as quickly as possible and thereby isolate the power supply device from the load as soon as possible after detecting the fault situation.

Each component may impose a limit relating to the amplitude of the maximum applicable current and/or a limit relating to the limit temperature that it can withstand.

The waveform of the trip current signal delivered by the method of the invention thus makes it possible to deliver a maximum value of trip current that is greater than the maximum value in either of the two above-described known solutions and to deliver a quantity of energy, corresponding to the product $i^2t$, that is greater than in either of the two above-described known solutions. And this is made possible without having recourse to overdimensioning the inverter.

Depending on the thermal inertia of the electrical components of the power supply device, the periods directly following the first period are of amplitudes that present current amplitude less than or equal to the preceding period. It is thus possible to have the maximum amplitude of the first period over a plurality of first periods of the trip current.

The signal may be a squarewave signal of amplitude that may decrease over time starting from a moment. In other words, the AC trip current may be a squarewave signal that is amplitude modulated as a function of the thermal inertia of said electrical components.

The signal may equally well present any other AC signal waveform such as a sinewave or a triangular wave, it being possible to amplitude modulate the signal as a function of the thermal inertia of said electrical components.

The advantage of a squarewave signal compared with any other AC signal is that the quantity of current delivered over one period is maximized compared with other waveforms for an AC signal, i.e. over one half-period, the integral of the current is greater than the integral of the current for an AC signal or a triangular signal. In other words, a square waveform serves to maximize the energy delivered over time by the trip current compared with any other AC signal waveform.

In a first implementation of the method of generating a trip current, said following periods of the AC trip signal may present a pseudo-square waveform with rising and falling fronts and with extrema between two fronts presenting a decreasing waveform as a function of the thermal inertia of said electrical components.

The waveform of the trip current signal delivered by the method of the invention is thus even better matched to the thermal inertia of the components in order to deliver both a maximum trip current value and also a quantity of energy that are even greater.

Specifically, for periods after the first period, not only does the amplitude of the current signal decrease successively from one period to another, but within a given period of the signal, the crest of the pseudo-square waveform presents a value that is not constant but rather the absolute value between the rising front and the falling front of the period decreases for a positive crest and also decreases between the falling front and the following rising front of that period.

In other words, the trip AC may be a squarewave signal of amplitude that is modulated as a function of the thermal inertia of said electrical component and in which the value of the current between two fronts is likewise modulated as a function of the thermal inertia of said electrical components.

In a second implementation of the method of generating a trip current, before generating the trip current, the method may comprise accessing a memory including a chart of the trip current to be generated in order to trip the protection element.

In a third implementation of the method of generating a trip current, the chart may be drawn up beforehand by determining the maximum current value that can be withstood by each of the components of the power supply device and by determining the thermal inertia of each of said electrical components.

In a fourth implementation of the method of generating a trip current, the protection element may comprise a fuse, and tripping the protection element may comprise opening the fuse.

In a fifth implementation of the method of generating a trip current, the first period of said signal may present a square waveform.

The invention also provides a power supply device comprising terminals for connection to a load, terminals for connection to an electricity power supply network, electrical components, and a protection control unit configured to generate a trip current for causing a protection element that is connected between said load and said power supply device to trip.

According to a general characteristic of the invention, the protection control unit is configured to respond to an electrical fault situation being detected in the power supply device by delivering an AC trip signal having:

for a first period of said signal, a current amplitude equal to the maximum current amplitude that can be withstood by the electrical components of said power supply device; and for the following periods, a current amplitude that decreases as a function of the thermal inertia of said electrical components.

In a first embodiment of the power supply device, said device may further comprise a memory storing a chart of the trip current to be generated in order to trip the protection element.

In a second embodiment of the power supply device, the chart may be made beforehand by determining the maximum current value that can be withstood by each of the components of the power supply device and by determining the thermal inertia of each of said electrical components.

In a third embodiment of the power supply device, the protection element may comprise a fuse.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 3:
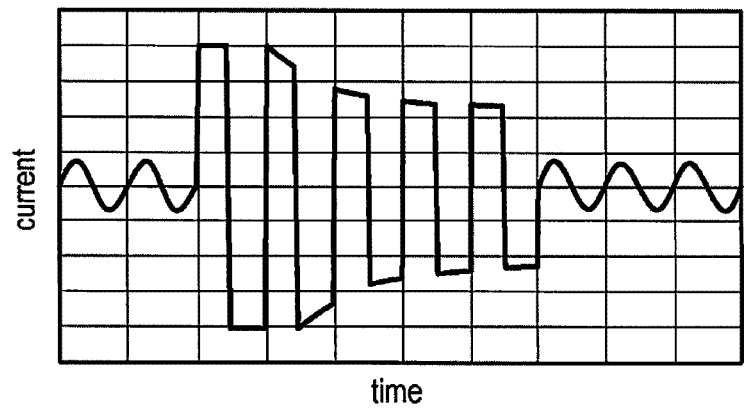
FIG. 3 shows an example of an AC signal generated in an implementation of the method of the invention.

FIG. 3 shows an example of an AC signal generated in an implementation of the method of the invention.

The trip current signal is an AC signal comprising a first period having the form of a squarewave signal with a current amplitude equal to the maximum current amplitude that can be withstood by the electrical components of said power supply device.

The following periods of the trip signal present a pseudo-square waveform in that the rising and falling fronts are very steep but the crests present a decreasing shape. Periods after the first period thus present an AC signal of current amplitude that decreases as a function of the thermal inertia of said components.

Thus, for periods after the first period, not only does the amplitude of the AC signal decrease successively from one period to the next, but it also decreases within a single period of the signal, the crests of the pseudo-squarewave signal are not of respective values that are constant, but rather the absolute value between the rising front and the falling front of the period decreases for a positive crest and also decreases between the falling front and the following rising front of that period.

In a variant, the signal could have some other AC waveform such as a sinewave or a triangular wave, the signal being amplitude modulated as a function of the thermal inertia of said electrical component starting from the second period of the periodic AC signal.

Figure 1:
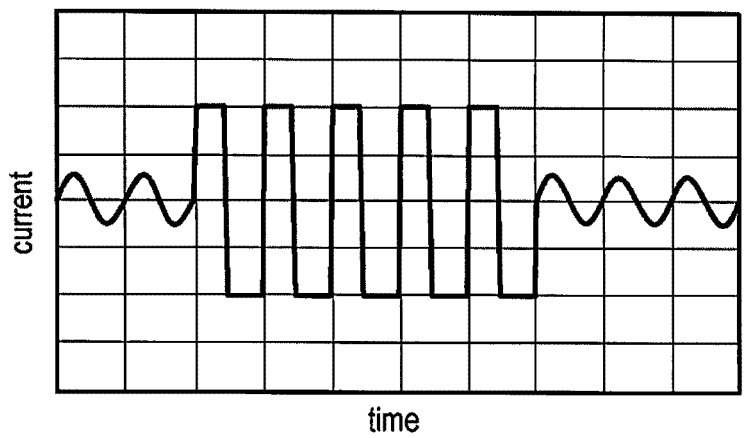
FIG. 1 shows an example of an AC signal in a first known solution.
Figure 2:
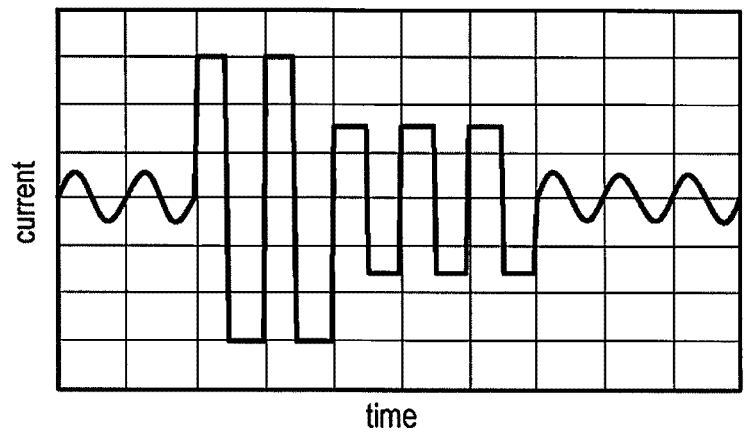
FIG. 2 shows an example of an AC signal in a second known solution.
Figure 4:
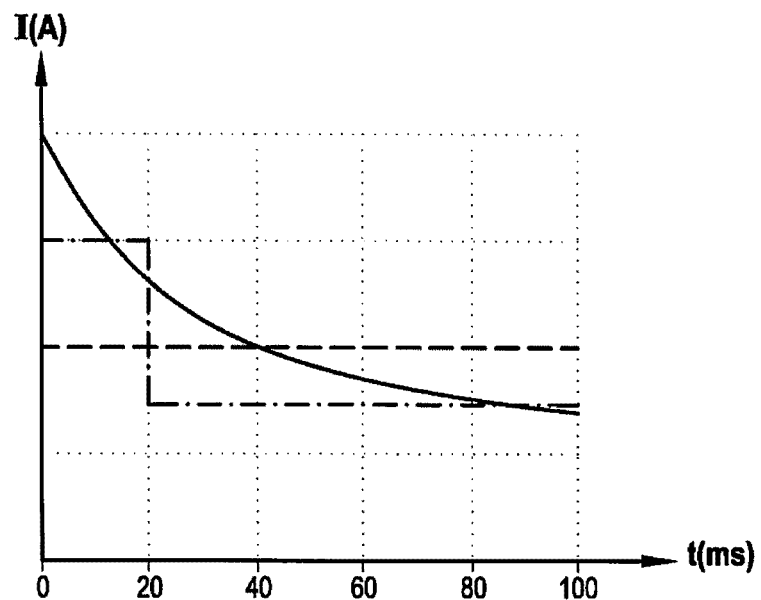
FIG. 4 is a graph comparing the amplitude of the trip current as a function of time for the two conventional solutions of FIGS. 1 and 2 and for the example of a signal generated in the implementation of the invention shown in FIG. 3.

As shown in FIG. 4, which is a graph comparing the amplitude of the trip current as a function of time for the two conventional solutions of FIGS. 1 and 2 and for the example of a signal generated in the implementation of the invention shown in FIG. 3, the waveform of the signal of the invention thus makes it possible to have an amplitude for the delivered trip current that is greater during the initial instant following detection of the fault, and that decreases continuously until the protection element has tripped.

In FIG. 4, the variation in the amplitude of the current for the method of the invention is plotted with a continuous line, the variation in the amplitude of the current in the known conventional solution of FIG. 1 is plotted with a dashed line, and the variation in the amplitude of the current in the second known solution of FIG. 2 is plotted with a chain-dotted line.

Figure 5:
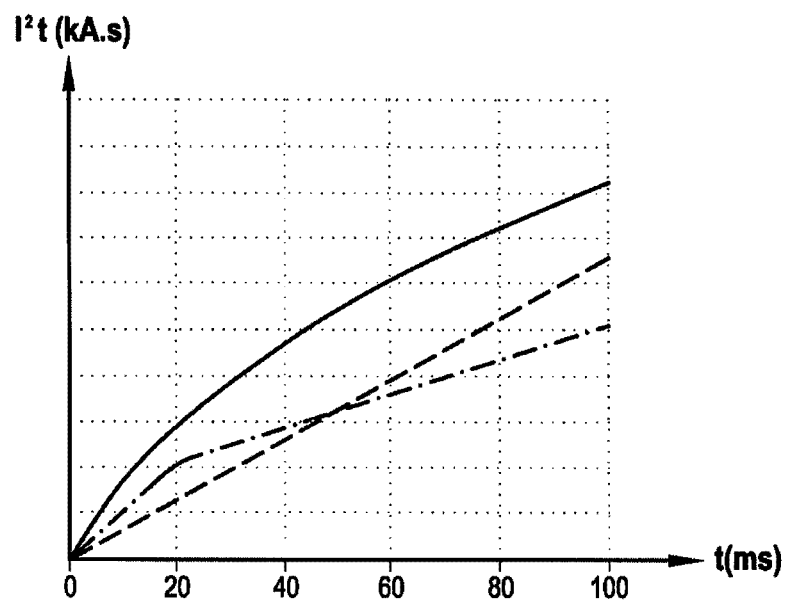
FIG. 5 is a graph comparing the energy delivered by the trip current over time for the two conventional solutions of FIGS. 1 and 2 and for the example of a signal generated in the implementation of the invention shown in FIG. 3.

As shown in FIG. 5, which is a graph comparing the energy delivered by the trip current over time for the two conventional solutions of FIGS. 1 and 2 and for the example of a signal generated in the implementation of the invention shown in FIG. 3, the waveform of the signal of the invention, when compared with the two known solutions, serves to deliver a greater quantity of energy immediately on generating the trip current and thereafter for a long period of time, in particular in the range 0 to 100 milliseconds (ms), thereby maximizing the chances of melting the fuse as soon as possible or of tripping the circuit breaker as soon as possible.

In FIG. 5, the variation in the energy delivered by the trip current of the invention is plotted with a continuous line, the variation in the energy delivered by the trip current in the known conventional solution of FIG. 1 is plotted with a dashed line, and the variation in the energy delivered by the trip current in the second known solution of FIG. 2 is plotted with a chain-dotted line.

Figure 6:
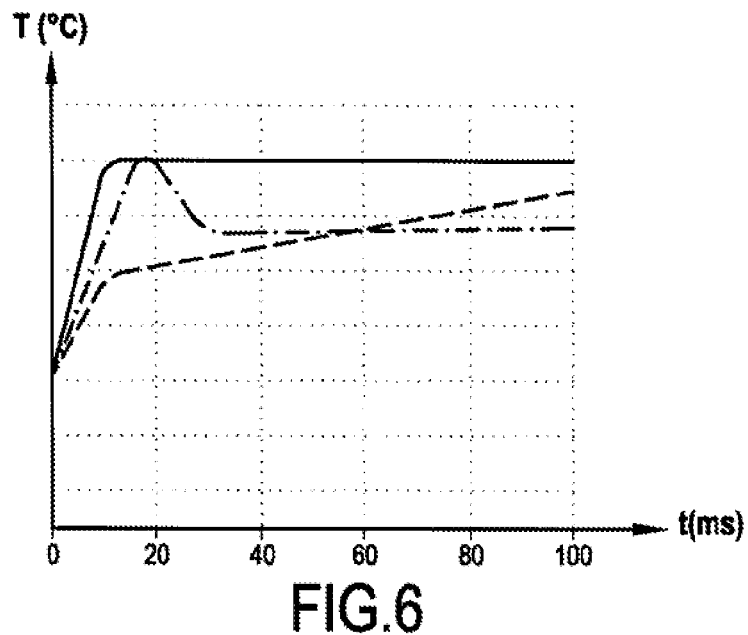
FIG. 6 is a graph comparing variation in the temperature of electrical components, and in particular of power semiconductors, in the UPS over time for the two conventional solutions of FIGS. 1 and 2 and for the example of a signal generated in the implementation of the invention shown in FIG. 3.

As shown in FIG. 6, which is a graph comparing the temperature variation of power semiconductors of the UPS, such as insulated gate bipolar transistors (IGBTs), over time for the two conventional solutions of FIGS. 1 and 2 and for the example of a signal generated in the implementation of the invention shown in FIG. 3, the signal waveform of the invention serves to control the rise in temperature of the components of the power supply device and to keep the temperature below the limit temperature.

In FIG. 6, the variation in the temperature of the power semiconductors of the UPS over time for the method of the invention is plotted with a continuous line, the variation in the temperature of the power semiconductors of the UPS over time for a method of the known conventional solution of FIG. 1 is plotted with a dashed line, and the variation in the temperature of the power semiconductors of the UPS over time for a method of the second known solution of FIG. 2 is plotted with a chain-dotted line.

Figure 7:
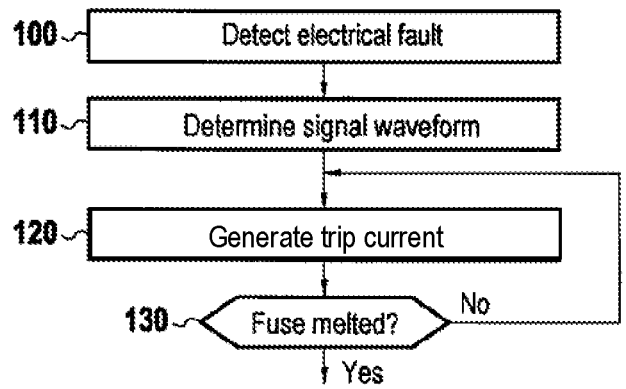
FIG. 7 is a flow chart of a method of generating a trip current in an implementation of the invention.
Figure 8:
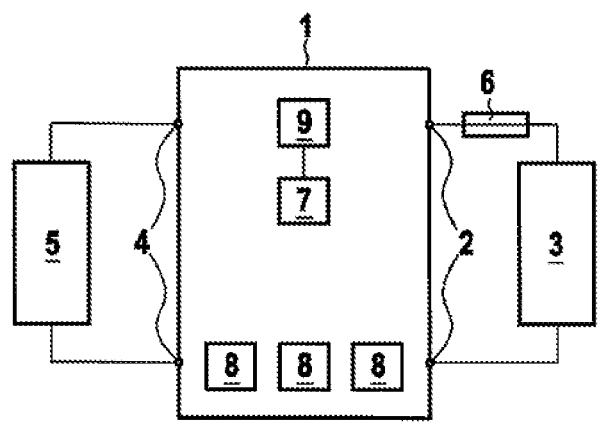
FIG. 8 is a diagram showing a power supply device in an embodiment of the invention.

FIGS. 7 and 8 are respectively a flow chart of a method of generating a trip current in an implementation of the invention and a diagram of a power supply device in an embodiment of the invention.

The power supply device is an uninterruptible power supply device 1, written UPS below, comprising first connection terminals 2 coupled to a load 3, second connection terminals 4 coupled to an electricity power supply network 5, and a protection control unit 7 configured to generate a trip current for melting a fuse 6 connected between the UPS 1 and the load 3 in the event of an electrical fault being detected in the circuit powering the load 3. To enable it to operate, the UPS 1 also includes various electronic components 8 such as insulated grid bipolar transistors (IGBTs).

In a preliminary step of the method of generating the trip current, an electrical fault appears in a portion of the electrical circuit of the UPS 1.

In a first step 100 of the method, the electrical fault is detected.

In a second step 110, the protection control unit 7 communicates with a memory 9 of the UPS in order to use a chart stored in the memory 9 to determine the waveform of the trip current to be delivered to the fuse 6 coupled to the outlet of the UPS 1, between the UPS 1 and the load 3. The memory 9 may be a memory portion of a microprocessor, which microprocessor may comprise the protection control unit 7.

The chart is drawn up and stored in the memory 9 during the design of the UPS 1. The chart is determined on the basis of the limit current and thermal inertial characteristics of each of the electrical components 8 of the UPS 1.

In a third step 120, the protection control unit 7 causes the trip current to be generated at the outlet from the UPS 1 having the fuse 6 connected thereto, with the trip current having a waveform corresponding to that of FIG. 3.

In a fourth step 130, it is verified whether the fuse 6 has melted, i.e. whether the electrical fault is isolated from the load.

The trip current continues to be generated with the waveform shown in FIG. 3 over time so long as the fuse 6 has not melted.

Once the fuse 6 has melted, the method is terminated, since the electrical fault has been isolated, i.e. the UPS 1 is isolated from the load 3.

The invention serves to maximize the trip current of an inverter, or UPS, while managing the amplitude of the trip current over time as a function of the thermal inertia of the components.

The invention claimed is:

1. A method of generating a trip current by a power supply device having electrical components and for the purpose of tripping a protection element connected between a load and said power supply device,
   wherein, in response to detecting an electrical fault situation in the power supply device, an AC trip current is generated having:
   for a first period of said AC trip current, a current amplitude equal to the maximum current amplitude that can be withstood by the electrical components of said power supply device; and
   for the following periods, a current amplitude that decreases as a function of the thermal inertia of said electrical components.

2. The method according to claim 1, wherein the following periods of the AC trip current present a pseudo-square waveform with rising and falling fronts and with extrema between two fronts presenting a decreasing waveform as a function of the thermal inertia of said electrical components.

3. The method according to claim 1, comprising, prior to generating the AC trip current, accessing a memory including a chart of the AC trip current to be generated in order to trip the protection element.

4. The method according to claim 3, wherein the chart is drawn up beforehand by determining the maximum current value that can be withstood by each of the electrical components of the power supply device and by determining the thermal inertia of each of said electrical components.

5. The method according to claim 1, wherein the protection element comprises a fuse, and tripping the protection element comprises opening the fuse.

6. The method according to claim 1, wherein the first period of said AC trip current presents a square waveform.

7. A power supply device comprising terminals for connection to a load, terminals for connection to an electricity power supply network, electrical components, and a protection control unit configured to generate a trip current for causing a protection element that is connected between said load and said power supply device to trip,
   wherein the protection control unit is configured to respond to an electrical fault situation being detected in the power supply device by delivering an AC trip current having:
   for a first period of said AC trip current, a current amplitude equal to the maximum current amplitude that can be withstood by the electrical components of said power supply device; and
   for the following periods, a current amplitude that decreases as a function of the thermal inertia of said electrical components.

8. The power supply device according to claim 7, further comprising a memory storing a chart of the AC trip current to be generated in order to trip the protection element.

9. The power signal device according to claim 8, wherein the chart is made beforehand by determining the maximum current value that can be withstood by each of the electrical components of the power supply device and by determining the thermal inertia of each of said electrical components.

10. The power supply device according to claim 7, wherein the protection element comprises a fuse.

* * * * *